United States Patent [19]
Frick et al.

[11] 3,966,673
[45] June 29, 1976

[54] POLYVINYLCHLORIDE POLYMER INHIBITED AGAINST RELEASE OF HYDROGEN CHLORIDE AT ELEVATED TEMPERATURE

[75] Inventors: Siegmund Frick, Troisdorf-Oberlar; Wilhelm Gresser, Troisdorf; Gunther Meyer, Troisdorf-Sieglar; Gerhard Bier, Troisdorf, all of Germany

[73] Assignee: Dynamit Nobel Aktiengesellschaft, Troisdorf, Germany

[22] Filed: July 13, 1973

[21] Appl. No.: 377,687

[30] Foreign Application Priority Data

July 15, 1972  Germany............................ 2234430

[52] U.S. Cl.................... 260/42.49; 260/29.6 R; 260/29.6 F; 260/296.6 RB; 260/29.7 UA; 260/42.27; 260/42.47; 260/42.53; 260/45.7 R; 428/463

[51] Int. Cl.$^2$........................ C08K 3/26; C08K 9/10
[58] Field of Search.......... 260/29.6 R, 42.49, 42.53

[56] References Cited
UNITED STATES PATENTS
3,265,644  8/1966  Herman et al................... 260/42.14

FOREIGN PATENTS OR APPLICATIONS
1,926,412  11/1970  Germany

*Primary Examiner*—James H. Derrington
*Attorney, Agent, or Firm*—Burgess, Dinklage & Sprung

[57] ABSTRACT

Polyvinylchloride inhibited against release of hydrogen chloride at elevated temperature is produced by polymerizing vinyl chloride in a reaction medium having finely divided calcium carbonate dispersed therein.

9 Claims, 2 Drawing Figures

POLYVINYLCHLORIDE POLYMER INHIBITED AGAINST RELEASE OF HYDROGEN CHLORIDE AT ELEVATED TEMPERATURE

BACKGROUND

Polyvinyl chloride products have been gaining popularity increasingly in recent years, especially in the construction industry, in the packaging industry, and in the insulation of wires and cables.

Although PVC is inherently flame-resistant, the production of hydrochloric acid at high temperatures may cause secondary damage in fires, for example by rendering machinery useless by corrosion.

To prevent this production of HCl, attempts have been made to add hydrochloric acid binding chemicals which also serve as fillers, such as calcium carbonate, prior to fabrication. This has not been as successful as anticipated, since only part of the HCl is bound. The ground chalk commonly used as the filler has proven to be too coarsely dispersed, and is usually contained in quantities that are too small to chemically bind all of the HCl that may be developed.

An attempt has also been made to provide a larger reaction surface for binding the HCl by using highly disperse calcium carbonate produced by precipitation, with an average grain size of 250 m$\mu$, corresponding to a special surface area of 10 to 18 m$^2$/g (German "Offenlegungschrift" 1,926,412). Even then, however, an approximately quantitative binding of the hydrochloric acid is achieved only if the chalk is used in such a great quantity as to appreciably impair the physical characteristics of the compound. An almost complete binding of the volatile HCl is achieved only with 100 to 120 parts of CaCO$_3$ per 100 parts of PVC, that is, with a very appreciable stoichiometric excess of CaCO$_3$, but this detracts especially from the tensile strength of the maufactured products.

THE INVENTION

Surprisingly, it has now been found that the impairment of the physical characteristics is avoidable and highly dispersed chalk is sufficient in no more than stoichiometric quantities for the complete binding of the volatile HCl if, instead of mechanically compounding the chalk and the polyvinyl chloride, the chalk is present in the autoclave during the polymerization of the vinyl chloride. Apparently this brings about a better distribution of the CaCO$_3$ in the PVC, as shown by electron microscope photography.

The subject of the invention, therefore, is a method of manufacturing PVC compositions which no longer yield free hydrogen chloride at elevated temperatures, this method being characterized by the addition of highly disperse, precipitated calcium carbonate during the polymerization of vinyl chloride or copolymerization of vinyl chloride with ethylenically unsaturated comonomers, the polymer containing CaCO$_3$ which is thus prepared being made in a conventional manner into molding compounds.

Surprisingly, it has even been possible, without any reduction of the unit-time yield, to perform the suspension polymerization in conventional autoclaves filled to the same degree as in the prior art with regard to the monomer, in the presence of the stoichiometric quantity of calcium carbonate. The most commonly used impeller or paddle stirrers may be used in spite of the higher viscosity of the mixtures; and although large PVC particles will form in addition to particles of normal size, the yield will not be less. However, if spiral and wall-running band mixer (FIG. 1) is used, non-lumpy batches will be obtained with high yields. With this type of stirring, and using only the band mixer for agitation, the mixing can be performed at lower rpm than with impeller mixers, so that even the power consumption will be hardly any greater than it is when no filler is added.

By a stoichiometric amount of calcium carbonate is meant the amount of CaCO$_3$ which is capable of binding stoichiometrically the amount of HCl that may be yielded by the polyvinylchloride or its copolymers, including any amounts of acid decomposition products originating from the comonomers. Also to be included are impurities in the precipitated chalks, especially CaSiO$_3$. According to the invention the amount of calcium carbonate is 90 to 105 percent of the stoichiometric amount. For a number of uses it is not desirable to use less than the 90–105 percent because of the danger of residues of liberated HCl, and on the other hand to exceed the 90–105 percent is unnecessary or is necessary to the extent of only a few tenths of a percent in accordance with the invention.

The stoichiometric amount is determined by thermal decomposition of PVC which yields 1 g mol HCl per monomer unit [-CH$_2$ . CHCL-] (molecular weight: 62.5), i.e. 62.5 g PVC produce 36.5 g HCl, requiring 0.5 g mol CaCO$_3$ (molecular weight: 100.08) = 50.04 g CaCO$_3$.

The highly disperse, precipitated calcium carbonate may be especially precipitated chalks having specific surface areas of 6 to 50 m$^2$g, especially 10 to 25 m$^2$/g as determined by BET-Method where in an adsorption of gaseous Nitrogen by surface of solids at the temperature of liquid Nitrogen (−196°C) is effected, followed by measuring heath of adsorption respectively pressure difference. (Lit.: Meffert, Langenfeld, Zeitschrift f. analytische Chemie Vol. 238 (1968) pages 187–193).

The prepared polymers with the CaCO$_3$ contained in them may be made into molding compounds in the usual manner, e.g., by the addition of any desired plasticizers, stabilizers, lubricants etc.

Molding compounds in which the vinyl chloride polymers consist wholly or largely of PVC or copolymers or graft polymers of vinyl chloride are to be considered as PVC compositions in accordance with the invention.

These copolymers may contain, in addition to vinyl chloride, amounts of 0.5 to 35 wt-percent of any desired ethylenically-unsaturated monomers, preference being given to vinyl acetate, vinyl propionate, vinylidene chloride, vinyl fluoride, olefins such as ethylene or propylene, acrylonitrile, or esters of acrylic acid, methacrylic acid, fumaric or maleic acid, or other unsaturated carboxylic acids in which the alcohol radical of the ester may contain 1 to about 25 carbon atoms.

The graft polymers may also have these named components, the basis of the graft being not only copolymers of vinyl chloride containing 0.1 to 60 wt-percent or more vinyl chloride, e.g., copolymers of vinyl chloride and ethylene, polymers of acrylonitrile, butadiene, styrene, butylacrylate or methylmethacrylate or two or three of these components, and the scion being mainly vinyl chloride. Valuable are those graft polymers of increased impact or notch-impact toughness which may also be used in amounts of 2 to about 35 wt-percent in mixture with PVC and copolymers of vinyl chloride in the mass.

Furthermore, PVC and vinyl chloride copolymers may be made into PVC compositions with amounts of 0.1 to 35 wt-percent of any desired additional polymer, such as copolymers of vinyl acetate with ethylene, with chlorinated polyethylene having chlorine contents of 15 to 45 wt-percent, or with chlorinated PVC having chlorine contents of 58 to about 72 wt-percent or with corresponding chlorinated copolymers of vinyl chloride.

On account of the relatively low decomposition temperature of PVC, corrosion due to the yielding of HCl is especially difficult to prevent in PVC and copolymers containing high percentages of vinyl chloride, and yet contents of vinylidene chloride, chlorinated PVC and chlorinated polyethylene, vinyl acetate, vinyl fluoride, acrylonitrile etc. may contribute to corrosion with their decomposition products.

Insofar as the PVC compositions are mixtures of polymers, the calcium carbonate may be added only during the polymerization or copolymerization of the vinyl chloride, while the other polymeric components of the mixture, such as chlorinated polyethylenes, chlorinated polyvinyl chloride or ethylene-vinylacetate copolymers, are added to the polymerization mixture without any $CaCO_3$.

On account of the favorable mechanical characteristics which are then produced, however, it is also possible, where chlorine-containing polymers or chlorinted polymers are added to the PVC, to add during the polymerization of the vinyl chloride a corresponding excess of $CaCO_3$ which will be capable of absorbing also the HCl or other decomposition product which might develop from the added materials.

Surprisingly, it has been found that the production of HCl in fires is eliminated virtually entirely, that is, HCl absorption values of 98 percent in frequently better than 99 percent are achieved, even though naught but the stoichiometric amount of $CaCO_3$ was added during the polymerization.

As described above, however, when precipitated chalks are mechanically added to the finished polymer in the prior art procedure, the stoichiometric amount is by no means sufficient.

The plasticizers may be any known plasticizers such as phthalate plasticizers, for example. Flame resistance is additionally favored by the use of special flame-retardant plasticizers, especially phosphate plasticizers.

As it has been found from the evaluation of electron microscope photographs, the grains of the $CaCO_3$ in the products of the invention are finer and better dispersed in the polymer in comparison with mechanical mixtures of PVC and the same $CaCO_3$ in which aggregations of up to 50 $\mu$ in size can be seen.

The physical characteristics of the PVC molding compound, especially tensile strength, elongation and elasticity, are better than they are in mechanical mixtures of the polymers with calcium carbonate-compared at the same HCl absorption.

The PVC compositions are therefore suitable for all common applications of plasticized and semi-hard PVC, which is not the case with mechanical mixtures of PVC and $CaCO_3$. They are especially suitable for applications in the building industry, packaging industry and electrical insulation, because in these cases the elimination of the production of HCl is especially important. Examples of such products are floor coverings, extruded building products such as paneling, handrails and baseboard moldings, decorative tiles, plastic rugs, cable sheaths, and the like. In addition, the PVC compositions may be used for the production of such products as extruded building products, e.g. stair handrails etc., which are customarily made of soft or semi-hard filled PVC or VC polymer. For such products, the prevention of release of HCl in case of fire is desirable, and the increased amount of calcium carbonate added permits savings of costly polymers while good physical characteristics are provided. As in the case of unfilled, plasticized PVC, an additional improvement of resistance to breakage and shock can be achieved here, too, through elasticizing additives, such as the above-named copolymers and graft copolymers.

Furthermore, the PVC containing calcium carbonate, which is prepared by the process of the invention, can be used with advantage also for films, boards and extrusions which are bonded to metals on one or both sides, especially aluminum or copper. Here the virtually complete absorption of HCl has the additional advantage of preventing the destruction of the metal layer, whereas the HCl that would otherwise be released completely destroys aluminum, for example, by transforming it to the chloride.

Thus, the invention provides a process for preparing polyvinyl chloride polymer inhibited against release of hydrogen chloride at elevated temperature. The process involves producing the polymer by polymerizing vinyl chloride in a reaction medium having calcium carbonate dispersed therein for in situ incorporation of calcium carbonate in the polymer in dispersed condition.

The polymerization can be performed in any of the known, generally used procedures therefor.

The product of the process is polyvinylchloride plastic having finely divided calcium carbonate homogeneously dispersed therein. The calcium carbonate has a surface area of 6–50 $m^2/g$, and inhibits release of hydrogen chloride from the plastic at elevated temperature.

THE DRAWINGS

Figure 1:
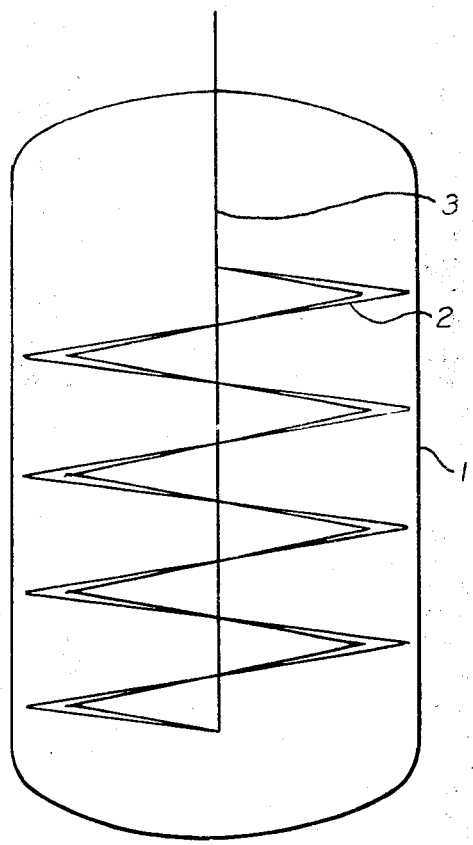
FIG. 1 is a schematic representation of a reactor for the process of the invention.

As noted above, the polymerization is preferably worked out in a vessel outfitted with a spiral, wall-running band mixer, and such a reactor is indicated in FIG. 1. Vessel 1 is outfitted with spiral, wall-running band mixer 2, which is mounted on shaft 3 in any suitable way for rotation in the vessel. The band mixer can be rotated in either direction.

Figure 2:
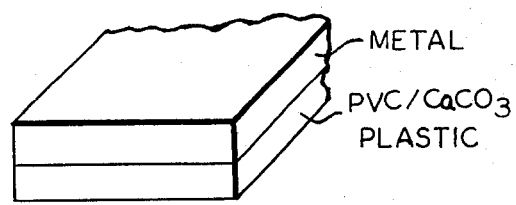
FIG. 2 is a showing of a laminate product of the invention.

In FIG. 2 a laminate article according to the invention is shown. A layer of metal, e.g., aluminium or copper, is bonded in any suitable, known way, to a layer of PVC plastic according to the invention.

The following examples operate with standardized and therefore comparable formulations, so that the process achieved is clearly recognizable; they do not, however, signify any restriction of the invention with regard to the usable components of the PVC compound.

In the examples and elsewhere herein, "pats" are parts by weight. "S-PVC"~ is PVC received by a polymerisation process, where the monomer is suspended in an aqueous phase in the presence of protective colloids such as cellulose derivatives.

Polymerisation described in the following examples can be performed at pressures between 2 and 12 atmospheres under stirring between 60 and 500 turns per minute.

EXAMPLE 1

Mechanical mixture for purposes of comparison.

The components listed below are mixed together in the stated sequence in a fluid mixer. A blanket is prepared from the mixture within 5 minutes at a roll temperature of 170°C. Specimens of this blanket, some containing $CaCO_3$, some not, are decomposed in a low-temperature carbonizing apparatus at 650°C with a delivery of 50 l/h of air, and the amount of HCl liberated is measured. As a check, the amount of HCl bound by $CaCO_3$ was determined, and the HCl absorption percentage was determined on the basis of these two component figures, 100% being taken as the amount of HCl that can be liberated from PVC specimens not containing $CaCO_3$ under the same conditions, this corresponding to the theoretical amount.

| | |
|---|---|
| 100 wt-parts | S-PVC (K value: 68) |
| 80 wt-parts | chalk (spec. surface 5.4 m²/g) |
| 62.5 wt-parts | dioctylphthalate |
| 0.78 wt-parts | stabilizer (dibutyl tin mercaptide with small amounts of dibutyl tin carboxylate) |
| 0.57 wt-parts | epoxidized soybean oil |
| HCl absorption: | 16.7% |

EXAMPLE 2

Mechanical mixtures for purposes of comparison.

The following mixture was prepared and tested the same as in Example 1.

100 wt-parts S-PVC (K value: 68)
80 wt-parts $CaCO_3$ (Winnofil-S, produced by ICI Great Britain (spec. surface 18.8 m²/g)
62.5 wt-parts dioctyl phthalate
0.78 wt-parts stabilizer (dibutyl tin mercaptide with small amounts of dibutyl tin carboxylte)
0.57 wt-parts epoxidized soybean oil
HCl absorption: 90.8 percent A finely divided, precipitated $CaCO_3$, accordingly, when worked mechanically into the finished polymer, brings about a higher absorption of HCl than is accomplished in Example 1, but about 10 percent of the HCl that can be liberated remains unbound.

EXAMPLE 3

Mechanical mixture for purposes of comparison.

The HCl absorption can be improved somewhat by using the stoichiometric amount of Winnofil-S with reference to the PVC while making allowance for the inactive calcium silicate content ($CaCO_3$: 91.7%; $CaSiO_3$: 8.3%):

100 wt-parts S-PVC (K value: 68)
88.5 wt-parts $CaCO_3$ (Winnofil-S) (spec. surface 18.8 m²/g)
62.5 wt-parts dioctyl phthalate
0.78 wt-parts stabilizer (dibutyl tin mercaptide with small amounts of dibutyl tin carboxylate)
0.57 wt-parts epoxidized soybean oil
HCl absorption: 94.8 percent Accordingly, mechanically incorporated, finely divided $CaCO_3$ is not capable of binding completely a stoichiometric amount of HCl released from PVC.

EXAMPLE 4

Polymerization in the presence of $CaCO_3$.
300 g vinyl chloride
600 g water
0.37 g methoxyethylcellulose
0.37 g hydroxyethylcellulose
0.75 g dilauroyl peroxide
0.75 g didodecylperoxydicarbonate
0.75 g lauric acid ethylene oxide condensate
261.9 g $CaCo_3$ (Winnofil-S) (spec. surface 18.8 m²/g)

In a 1.5 liter glass autoclave an inside diameter of 8.5 cm., equipped with a spiral stirrer having an outside diameter of 8.0 cm and an inside diameter of 7.2 cm and a pitch of 15.0 cm., water, protective colloid and $CaCO_3$ are placed. The closed autoclave is evacuated several times to remove the air oxygen. The filler is then stirred into aqueous phase at high rotatory speed. With the stirrer stopped, vinyl chloride is pumped into the autoclave through a cartridge in which the initiators are located. The polymerization is then performed at 53°C and at a stirrer speed of 250 RPM. The polymer obtained is separated from the aqueous phase, washed with water and dried at 60°C. Yield: 96 percent. Plasticizers and stabilizer including epoxidized soya oil are added to the dried PVC/$CaCO_3$ mixture as in Example 1 and the mixture is worked into blanket on a roll mixer under the conditions described in that example. HCl absorption: 99.1 percent.

In like manner, the calcium carbonate-containing PVC of this example was additionally combined with (a) 15 parts of a copolymer of 45 wt-percent vinyl acetate and 55 wt-percent ethylene and (b) 25 parts of a chlorinated polyethylene (40 wt-percent Cl) and made into a blanket on a roll mixer.

The HCl absorption was as complete as ever. The specimens prepared had an improved impact and notch-impact toughness.

Similar results were obtained with a $CaCO_3$ having a surface of (a) 22.3 m²/g and (b) 27.4 m²/g.

EXAMPLE 5

Polymerization in the presence of $CaCO_3$.

The quantity of the $CaCO_3$ used in Example 4 is reduced to 240 g, which corresponds to the stoichiometric amount of $CaCO_3$ at a PVC yield of 90 percent. Otherwise the procedure is the same as in Example 4. The HCl absorption of the polymer when made into a blanket on a roll mixer was: 99.5 percent.

EXAMPLE 6

Polymerization in the presence of $CaCO_3$.
In a 100-liter autoclave having an inside diameter of 48.7 cm,
46 kg water
0.041 kg methyl cellulose
0.048 kg lauroyl peroxide
0.025 kg isopropylperoxydicarbonate
19.2 kg $CaCO_3$ (Winnifil-S) (18.8 m²/g)
were mixed and, after the air oxygen had been removed by evacuation, 24 weight-parts of vinyl chloride were pumped in and stirred with a spiral stirrer having an outside diameter of 47.6 cm and an inside diameter of 38.0 cm and a pitch of 30.0 cm. at 80 rpm for 8 hours at 53°C until the pressure dropped. 40 kg of $CaCO_3$-PVC mixture is thus produced. It is mixed as in Example 1 with plasticizers and stabilizer. HCl absorption greater than 99 percent.

The polymerization was repeated in like manner, 18 parts of VC and 6 parts of vinyl acetate being used, and blankets were made on a roller mixer as above. Here again, the HCl absorption is complete.

place in portions of the sheets, necessitating an averaging of the verying values.

The tensile strength and yield stress of the products of the invention are greatly improved in comparison with the mechanical mixtures of the last column. The tensile strength of 150 kp/cm² in the mixture of Exam- Table 1

|  | Example 1 (Mechanical mix) | Example 5 (Mixed before polymerization) | Mech. Mixture I and II* | |
|---|---|---|---|---|
| PVC | 100 parts | 100 parts | 100 parts | 100 parts |
| Plasticizer | 62.5 parts | 62.5 parts | 65.0 parts | 70.0 parts |
| Chalk | 80 parts | 88 parts | 100 parts | 120 parts |
| Stabilizer | 1.35 parts | 1.35 parts | 11 parts | 5 parts |
| Percentage of volatile HCl | 83.3 parts | 0.5 parts | <1 parts | <1 parts |
| Tensile strength lengthwise (kp/cm²) | 150 | 130 | 90 | |
| Tensile strength crosswise | — | 95 | 65 | |
| Elongation at rupture (%) | 165 | 287 | 246 | |
| Shore hardness A/C (DIN 53,505) | 94/80 | 86/63 | 85/65 | |
| Punch impression depth, 24 hours loading (in mm) | 0.01 | 0.04 | 0.02 | |
| same, at 1 min loading, 1 min unloaded | 0.08 | 0.19 | — | |
| Shock elasticity (impact resilience) (DIN 53,512) | 71 | 80 | 87 | |
| Yield stress | — | 92 | 74 | |

*See infra

In the foregoing table the mechanical mixtures I and II containing finely divided CaCO₃ of 18.8 m²/g surface are compared with the material of Example 5, that is, with specimens in which a virtually complete HCl absorption is achieved. Mechanical mixtures I and II otherwise differ from the product of Example 5 as is indicated in the table. For this purpose 100 and 120 parts of CaCO₃ are required in the mechanical mixtures I and II, respectively, that is, much more than stoichiometric amounts, and 65 and 75 parts of dioctylphthalate, respectively, as plasticizer, plus 11 and 5 parts of basic lead carbonate, respectively, for stabilization.

This mixture is compared in the first column with the mixture of Example 1, whose poorly dispersed chalk of 5.4 m²/g specific surface does not permit any appreciable HCl absorption, but whose formulation, which is equal quantity-wise (except for the amount of CaCO₃) to that of Example 5, permits comparison of the physical data.

The comparison was made in each case between sheets 2 mm thick. The values in the 2nd and 3rd columns are averages because, owing to production on a rolling mill train, some orientation and stretching took ple 1 is not comparable because an orientation has been produced by great stretching in one direction.

Suprisingly, in the composition of the invention given in Example 5, a very high elongation at rupture and depth of punch penetration are achieved, which are superior to all mechanical mixtures and which indicate an unexpected increase in elasticity.

In Table 2 are listed the results of a burning test in which the mechanical mixtures correspond to Mechanical Mixture I in Table 1 and the "CaCO₃ incorporated by polymerization" specimens correspond to Example I, and they contain CaCO₃ of 18.8 m²/g. Example 1 contains CaCO₃ of 5.4 m²/g. The quantities and type of the plasticizers were standardized, and the amounts of calcium carbonate were varied.

As it can be seen, in the case of the specimens in which the CaCO₃ is incorporated by polymerization, not only is complete absorption of the HCl achieved with comparatively small amounts of CaCO₃, but also a low flammability and very short afterburning time can be obtained.

Table 2

| Burning test in accordance with DIN 53,438 | | Mechanical mixture | | CaCO₃ incorporated by polymerization | | Example 1 |
|---|---|---|---|---|---|---|
| PVC | Wt-parts | 100 | 100 | 100 | 100 | 100 |
| Dioctylphthalate | Wt-parts | 30 | 65 | 30 | 65 | 65 |
| Diphenylcresylphosphate | Wt-parts | 35 | — | 35 | — | — |
| CaCO₃ | Wt-parts | 96 | 96 | 80 88 96 | 80 88 96 | 80 |
| Stabilizer | Wt-parts | 1.36 | 1.35 | 1.35 | 1.35 | 1.35 |
| Burning test (DIN 53,438) Thickness, 1.9—2.1 mm | | K-1 | K-2 | K-1 | K-2 | K-1 |
| Afterburning time | seconds | 2.0 | 45* | 1 | 51 57 41* | 2 |

*Complete burning; reaches the first flame mark
Burning test rating:
K-1 = does not reach the first graduation mark.
K-2 = reaches the first graduation mark in 20 or more seconds
K-3 = reaches the first graduation mark in less than 20 seconds

What is claimed is:

1. Process of preparing vinyl chloride polymer inhibited against release of hydrogen chloride at elevated temperature, which comprises producing the polymer by polymerizing vinyl chloride in a reaction medium having calcium carbonate dispersed therein for in situ incorporation of calcium carbonate in the polymer in dispersed condition, the proportion of calcium carbonate being 90–105 percent of the stoichiometric amount which is 50.04 g $CaCO_3$ per 62.5 grams of vinyl chloride in the polymer.

2. Process according to claim 1, the calcium carbonate being precipitated calcium carbonate.

3. Process according to claim 1, and including in the reaction medium another ethylenically unsaturated monomer for production of a copolymer of vinyl chloride.

4. Process according to claim 1, the calcium carbonate having a surface area of about 6–50 $m^2/g$.

5. Process according to claim 1, the calcium carbonate having a surface area of about 10–25 $m^2/g$.

6. Process according to claim 1, and carrying out the polymerization in a vessel outfitted with a spiral, wall-running band mixer and agitating the reaction medium with the band mixer during the polymerization.

7. Polyvinylchloride plastic produced by the process of claim 1.

8. Shaped article of plastic according to claim 7.

9. Process according to claim 1, wherein the vinyl chloride polymer is polyvinyl chloride.

* * * * *

UNITED STATES PATENT AND TRADEMARK OFFICE
CERTIFICATE OF CORRECTION

PATENT NO. : 3,966,673
DATED : June 29, 1976
INVENTOR(S) : Dr. Siegmund Frick, Dr. Wilhelm Gresser, Dr. Günther Meyer and, Dr. Gerhard Bier It is certified that error appears in the above-identified patent and that said Letters Patent are hereby corrected as shown below:

Page 1, [30] Foreign Application Priority Data, change "July 15, 1972" to --July 13, 1972--.

Signed and Sealed this

First Day of March 1977

[SEAL]

Attest:

RUTH C. MASON
Attesting Officer

C. MARSHALL DANN
Commissioner of Patents and Trademarks